No. 658,054. Patented Sept. 18, 1900.
L. G. WULBERN.
SPRING TENSION DEVICE FOR VALVE GEAR.
(Application filed Apr. 5, 1900.)
(No Model.)

Witnesses:
Harry S. Rohner
Herbert D. Lawson

Inventor:
Louis G. Wulbern
By Victor J. Evans
Attorney

THE NORRIS PETERS CO., PHOTO-LITHO., WASHINGTON, D. C.

UNITED STATES PATENT OFFICE.

LOUIS G. WULBERN, OF BIRMINGHAM, ALABAMA.

SPRING TENSION DEVICE FOR VALVE-GEAR.

SPECIFICATION forming part of Letters Patent No. 658,054, dated September 18, 1900.

Application filed April 5, 1900. Serial No. 11,592. (No model.)

*To all whom it may concern:*

Be it known that I, LOUIS G. WULBERN, a citizen of the United States, residing at Birmingham, in the county of Jefferson and State of Alabama, have invented new and useful Improvements in Spring Tension Devices for Valve-Gear, of which the following is a specification.

This invention relates to a new and useful spring tension device for valve-gears, and is especially adapted for use upon the springs of the valve-gear of "Corliss" engines.

The primary object of the invention is to provide a device of simple and durable construction which is adapted to be secured to the claw of the valve-gearing and which is provided with means whereby the tension of the spring bearing thereagainst may be readily regulated.

To these ends the invention consists in the novel construction and combination of parts hereinafter more fully described and claimed, and illustrated in the accompanying drawings, showing the preferred form of my invention, and in which—

Figure 1:
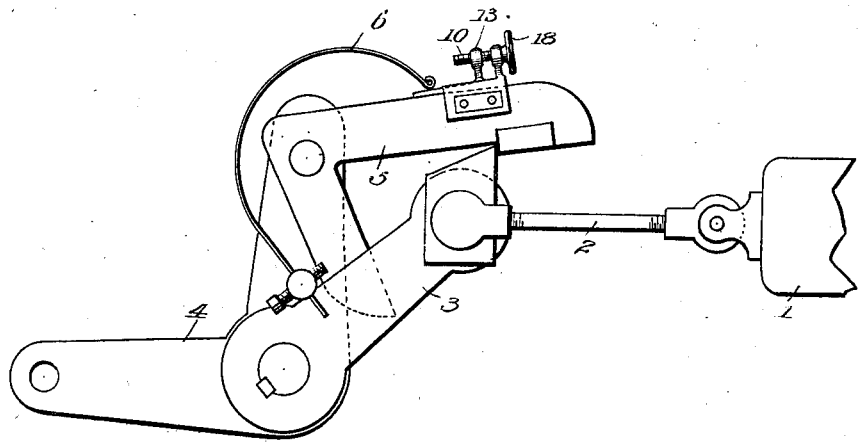
Figure 2:
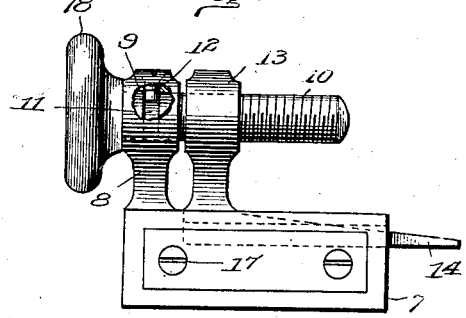
Figure 3:
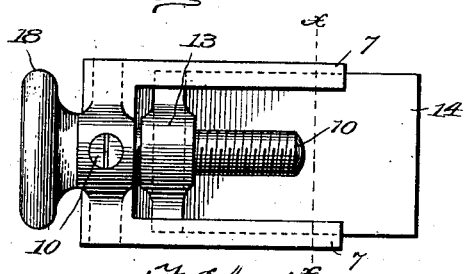
Figure 4:
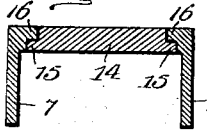

Figure 1 is a view of the device applied to the valve-gear of a Corliss engine. Fig. 2 is a side elevation of the attachment. Fig. 3 is a plan view thereof; and Fig. 4 is a section on line *x x*, Fig. 3.

Referring to said figures by numerals of reference, 1, 2, 3, and 4 are the dash-pot, connecting-rod, and levers, respectively, of the valve-gear of a Corliss engine, and to one of the levers 4 is secured a claw 5, as shown. A spring 6 is secured to the gear in the usual manner, and its free end is adapted to bear upon the improved attachment upon the claw 5. The attachment comprises a clamp formed of two plates 7, adapted to hang at opposite sides of the claw and connected at one end by means of an upright portion 8, having a longitudinally-extending passage 9 therein adapted to receive a screw 10, provided with an annular groove 11 therein for the reception of a screw 12, projecting from the portion 8. The adjusting-screw 10 engages with an upwardly-extending arm 13, formed at one end of a wedge 14, slidably mounted upon the claw between the plates 7, which extend above the upper surface thereof. This wedge is provided at each edge with flanges 15 of even thickness, which slide beneath shoulders 16, formed upon the inner faces of the plates 7. The plates 7 may be secured to the claw in any suitable manner, as by means of set-screws 17. The adjusting-screw 10 is provided with a head, as 18, whereby the same may be readily turned. The free end of the spring 5 bears upon the wedge 14, and it will be understood that by adjusting said wedge forward or backward by turning the screw 10 the tension of the spring 5 may be readily increased or diminished, as is desired.

While I have shown the preferred form of my invention, I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. The combination with a claw and spring of the valve-gear of an engine, of a clamp secured to said claw, an upright thereto, a screw keyed within the upright, a wedge upon the claw engaged by the screw, and means for holding the wedge in position within the clamp, said spring bearing upon the wedge.

2. The combination with a claw and spring of the valve-gear of an engine, of a clamp secured to said claw, an upright thereto, a screw keyed within the upright and revoluble therein, a wedge slidable upon the claw, an arm thereto engaged by the screw, and flanges upon the sides of the wedge adapted to slide within the clamp, said spring bearing upon the wedge.

In testimony whereof I affix my signature in presence of two witnesses.

LOUIS G. WULBERN.

Witnesses:
F. A. BURBIDGE,
C. MATHISSON.